(12) United States Patent
Baissus et al.

(10) Patent No.: US 7,757,296 B2
(45) Date of Patent: Jul. 13, 2010

(54) METHOD OF MANAGING SOFTWARE COMPONENTS THAT ARE INTEGRATED INTO AN EMBEDDED SYSTEM

(75) Inventors: Eric Baissus, Le Rouret (FR); David Lamy-Charrier, Biot (FR)

(73) Assignee: Open Plug, Sophia-Antipolis (FR)

( * ) Notice: Subject to any disclaimer, the term of this patent is extended or adjusted under 35 U.S.C. 154(b) by 1128 days.

(21) Appl. No.: 11/328,725

(22) Filed: Jan. 10, 2006

(65) Prior Publication Data
US 2006/0161768 A1  Jul. 20, 2006

Related U.S. Application Data

(63) Continuation of application No. PCT/FR2004/001820, filed on Jul. 9, 2004.

(30) Foreign Application Priority Data

Jul. 10, 2003 (FR) .................................. 03 08489
Mar. 26, 2004 (FR) .................................. 04 03174

(51) Int. Cl.
*H04L 9/32* (2006.01)
(52) U.S. Cl. ............................ 726/26; 726/27; 726/30
(58) Field of Classification Search ................ 380/247; 726/22, 26–30; 713/187, 189–194; 717/100, 717/120, 140, 168
See application file for complete search history.

(56) References Cited

U.S. PATENT DOCUMENTS 5,870,588 A * 2/1999 Rompaey et al. ............. 703/13
6,108,420 A 8/2000 Larose et al.
6,188,975 B1 * 2/2001 Gay .............................. 703/22
6,259,958 B1 7/2001 Steinman et al.

FOREIGN PATENT DOCUMENTS

EP      0 940 747 A2   8/1999

OTHER PUBLICATIONS

IBM Technical Disclosure Bulletin, "Dynamic Loading Using an Extended Router Linkage Mechanism", vol. 30, No. 9, Feb. 1988, pp. 373-374.
Façade, XP-002296822, "Structural Patterns", 1995, pp. 185-193.

* cited by examiner

*Primary Examiner*—Hosuk Song
(74) *Attorney, Agent, or Firm*—Harness, Dickey & Pierce, P.L.C.

(57) ABSTRACT

The invention relates to a method of managing an embedded system comprising at least one original code which is associated with a computer device, at least one embedded code which is associated with the embedded system, and at least one processor which is associated with said embedded system. The invention is characterized in that it comprises a first step involving the creation of at least one autonomous software component, consisting in: analyzing the original code in order to identify the target functions that are called by the original code but not implemented in said code; determining a corresponding function identifier for each of said non-implemented functions; and replacing said non-implemented function calls with at least one switching function PLUG call which is implemented by the embedded code. The invention is further characterized in that it comprises a second step involving the execution of the component on the embedded system, the aforementioned switching function PLUG controlling the rerouting of the processor towards the address of the non-implemented target function corresponding to the function identifier.

79 Claims, 7 Drawing Sheets

METHOD OF MANAGING SOFTWARE COMPONENTS THAT ARE INTEGRATED INTO AN EMBEDDED SYSTEM

CROSS-REFERENCE TO RELATED APPLICATIONS

This application is a continuation of PCT/FR2004/001820, filed Jul. 9, 2004, which claims priority to French Application No. 03/08489, filed Jul. 10, 2003 and French Application No. 04/03174, filed Mar. 26, 2004; all of these applications are incorporated by reference herein.

BACKGROUND AND SUMMARY

The present invention relates to the field of software components in embedded systems, in particular in mobile telephones. The present system relates more particular to a method of managing components, including inter-component calls and dialogues.

The complexity of the software residing in embedded systems such as portable telephones, cameras or navigation systems for automobiles has increased incredibly during the last ten years, in order reach levels comparable to those reached in appliances of the personal computer (PC) type. The industry, in particular that of mobile telephones, is confronted with the challenge of rapidly developing new appliances, integrating a very large number of functionalities on a myriad of very diverse platforms. Associated with this growth in complexity, embedded systems must today meet a specification combining at the same time constraints of flexibility, openness (via downloading or by the addition of accessories or memory cards), costs, speed of development and robustness or even security. These constraints are found particularly with regard to the software in such systems.

In the light of these constraints, it is clear that the challenge with which the industry is confronted vis-à-vis the software is no longer linked essentially to a problem of development (of such and such a software having a given functionality that is more or less complex to implement), but rather to a problem of integration and validation (of pieces of software of diverse origins), as has been the case for the hardware industry for a decade. The aim of the present invention is to facilitate the task of integrating and validating complex embedded software systems by virtue of a technology which makes it possible to isolate the software ends by converting them into independent components, whilst keeping, at the system level, performances equivalent to the normal technologies at the present time. And this, whilst opening up the system thus formed to additions or corrections once the appliances are marketed.

According to the prior art, embedded software is traditionally developed in the form of software layers, layers possibly having, in the case of the most developed systems, privileges of access to the processor or to specific resources of the system. The intra- and inter-layer communication takes place in a procedural manner (function calling). As for the final image of the software, this is produced following a phase of end by end compilation and "linkage" of the whole, as illustrated in FIG. 1, where three codes are referenced 1, 2 and 3, and where the final image is obtained after editing of links ("linkage") of codes 1, 2 and 3 once in memory, ready for execution by the processor.

This type of development has the advantage of creating very effective systems in terms of use of resources and speed. On the other hand, they combine a certain number of problems, problems becoming more and more difficult to manage with increasing complexity of the system. Problems of testing, development by distinct parts, transfer to other platforms, updating, stability, flexibility, etc, can be cited in particular.

Also according to the prior art, in order to mitigate these problems, the majority of players in the world of embedded technology have adopted an approach closer to the so-called "component" approach developed for systems that are much larger and more complex (in particular with regard to the servers) with much more decrepit platforms. This was achieved by replacing, when possible, procedural calls with exchanges of messages by the operating system (OS standing for "operating system" hereinafter), as illustrated in FIG. 2, where three codes are referenced 1, 2 and 3, and where the mailboxes 7 receive the messages 5 sent by the various codes using the router 6 and are managed by the OS. This makes it possible to separate much better, and in a controlled manner, the exchanges between software entities. On the other hand, because of the burden of such a mechanism, (in terms of development and resource demands) this mechanism is used only partially, the procedural calls remaining common practice in such systems, thus limiting the advantage of the approach since the majority of the disadvantages cited above continue.

The prior art also knows, in the field of embedded components, through the patent application PCT WO 03/009137, a method for integrating software components for embedded systems. The modules are instantiated therein independently by virtue of a "manager" ensuring that a module does indeed have all the other modules that it requires before launching an execution. However, this application does not mention any effective communication between the components in order better to utilise the resources.

The present invention sets out to remedy the drawbacks of the prior art by setting up a way of communicating between the software entities that is just as efficient as the procedural calls whilst enabling these entities to act as completely independent software components. To do this, the present invention is of the type described above and is remarkable in its broadest acceptance, in that it concerns a method of managing an embedded system comprising:

- at least one original code associated with computer equipment,
- at least one embedded code associated with the embedded system,
- at least one processor associated with the embedded system, characterised in that it comprises the steps consisting of:
- the creation of at least one self-contained software component consisting of:
- analysing the original code in order to identify the target functions called by the original code and not implemented in the original code, and
- determining, for each of the functions not implemented, a corresponding function identifier,
- replacing the calls of the functions not implemented with the call of
  - at least one PLUG switching function implemented by the embedded code,
- the execution of the component on the embedded system, the PLUG switching function controlling the redirection of the processor to the address of the target function not implemented corresponding to the function identifier.

Preferably, it comprises the following supplementary steps:

on the creation of the self-contained software component:

analysing the original code in order to identify the target functions called having as their parameter the address of an original function defined in a component, and replacing the callback parameter with the call of a specific function, automatically generating the associated specific function, a function supplying an identifier of the original function and calling at least one PLUG switching function implemented by the embedded code.

Preferably, it comprises the following supplementary steps:

on creation of the self-contained software component:

analysing the original code in order to identify any information not defined in the original code and which is needed by the component in order to be able to be executed, adding the list of this missing information to the component when it is generated, on execution of the component, modifying the code of the component once the initially missing information can be supplied by the system, in order to make the component executable on the embedded system.

Advantageously, the component resides on the embedded system. Preferably, the component is downloaded by the embedded code. Advantageously, the component is in encrypted form at the time of its creation. In this case, the method also comprises a step of decrypting the component. Advantageously, the component is replaced by another component fulfilling the same function. Preferably, the component is placed for execution in a memory area of the embedded system different from the memory area in which the execution memory area was initially situated. Advantageously, the execution memory area is accessible to the processor and possesses specific properties in terms of speed of execution, consumption and accessibility in terms of access rights.

Preferably, the PLUG switching function implements a function of displaying the various calls processed with the associated parameters. In addition, the PLUG switching function implements a function of recording the various calls processed with the associated parameters. In this case, the recordings of the calls comprise at least one additional item of information for each of the calls (time information, execution context, memory use). Preferably, the recordings of the calls related to the component are used to simulate the component in a self-contained fashion. Advantageously the recordings of the calls related to the component are used for the detection of errors in the embedded code. In this case, the error detection recordings are transmitted to another computer resource responsible for analysing the errors, once an error is detected.

Advantageously, the target function identifiers not implemented constitute parameters of the PLUG switching function. Advantageously, it comprises no operation of copying the parameters of the target function not implemented. Preferably, the identifier of the function not implemented is stored in a stack of the processor before calling the PLUG switching function, the identifier thus stored then being used by the switching function in order to implement the demand for the redirection to the function corresponding to the identifier. Preferably, the identifier of the function not implemented is stored in a register of the processor before the calling of the PLUG switching function, the identifier thus stored then being used by the switching function in order to implement the command for the redirection to the function corresponding to the identifier.

According to one embodiment, the target functions are implemented on another processor of the embedded equipment. According to another embodiment, the target functions are implemented on another computer resource, other than the embedded system. Preferably, the PLUG switching function forms a set of specific actions associated with the target function called, all the actions by target function previously having been defined and stored on the embedded system.

For example, the set of specific actions comprises the change from one context of the processor to another, the installation and execution of another component, the notification of one or more components of the call of the target function, the notification of the user of the embedded system, or the notification of another computer resource. Preferably, the set of actions is modifiable dynamically. Advantageously, the PLUG switching function also performs a step of generating a specific action in the case where the target function corresponds to an unavailable function identifier. In this case, the specific action is determined by an attribute of the identifier of the unavailable function.

Preferably, the PLUG switching function also performs a step of verifying the rights of the component to call the target function. In this case, the verification is performed from an access rights table indicating which component can call which function. Advantageously, the access rights table is modifiable by the final user. Preferably, the access rights table is modifiable remotely by another computer resource.

Advantageously, the PLUG switching function, in the case where the target function corresponding to an original function identifier is not available, also demands an action of searching for an equivalent function, performing the same functionalities, but with a different format from that of the target function, and executing the equivalent function. Preferably, the PLUG switching function, in the case where the function corresponding to a function identifier is not available, also demands an action of locating a computer resource corresponding to the unavailable function, and executing the function resulting from the search. In addition, the target function identifiers comprise a first item of information corresponding to the software component implementing the target function and a second item of information corresponding to the number of the target function in the component.

Preferentially, the PLUG switching function is performed using at least one table of correspondence between the target function identifier and the address of the target function. In addition, the table of correspondence is subdivided into a first table of correspondence between the item of information corresponding to the software component implementing the target function, and, for each of the components, a second table of correspondence between the number of the function and the address of the target function in the corresponding component. Preferably, the second tables are generated when the component is created. Advantageously, the second tables are recorded in read-only-memory. Preferably, characterised in that the first table is recorded in random access memory.

Preferably, the installation of said component is dependent on a prior authorisation. Advantageously, the execution of the component is dependent on a prior authorisation. In addition, the prior authorisation is dependent on a match between a key held by the embedded system (system key) and a key held by the component to be executed (component key), the system key being able to be calculated from an item of information uniquely specifying the embedded system.

In addition, when the component is being executed by the embedded system, a notification is supplied to another computer source and in that this other computer source, following this notification, transmits an authorisation or refusal to execute the component to the embedded system. Preferably, the other computer source, following the notification, transmits an authorisation or refusal to execute the component to the embedded system. In addition, the authorisation transmitted by the other computer resource includes a key (external key) which is combined with the component key and with the system key in order to authorise the execution of the component on the embedded system. Preferably, the authorisation transmitted by the other computer source is linked to the correct performance of a financial transaction at the other computer resource.

Advantageously, the external keys are saved in the embedded system before its commercial deployment, possibly following a financial transaction. Preferably, the external keys are saved in the embedded system following a financial transaction. In addition, the component includes at least one item of service quality information. Preferably, the service quality information is used by the embedded system in order to allocate resources before the execution of the component. Advantageously, the service quality information is the random access memory requirement of the component for its functioning including a minimum requirement information, average requirement information and optimum requirement information for its functioning, the list of the other components (associated components) that the component requires for its functioning, and version number information required by the associated component.

Preferably, the embedded system does not launch the execution of the component if the associated components do not respond to the version number indicated by the component. According to another embodiment, the embedded system does not launch the execution of the component if the associated components do not respond to a version number higher than that indicated by the component. Advantageously, the service quality information is the processing power requirement of the component.

In addition, the embedded system modifies the frequency of the processor of the embedded function according to the processing power requirement. In addition, the embedded system decides on which computer resource of the embedded system to execute the component according to the available resources of the various computer resources. Preferably, the embedded system decides to have the component executed on one or other of its computer resources according to the processing availability of each computer resource. Advantageously, the embedded system decides to have the component executed on one or other of its computer resources in order to minimise the power consumption of the embedded system.

According to one embodiment, if the embedded system cannot guarantee the requirements expressed by the component in at least one item of service quality information, the embedded system refuses the execution of the component. Preferably, the component includes at least one item of information for specifying the functionalities performed by the component (name of component, version, lists of functions implemented by the component, etc). In addition, the embedded system able to supply the list of components available on the embedded system and the component information associated with another computer resource that made the request in advance.

Preferably, the complete code that is to be executed by the embedded system is broken down into components in order to minimise the number of target functions not implemented by the component. In addition, the breakdown into components of the initial system is made by correlating the size of the components with the probability of being modified subsequently. The invention also concerns a non-embedded system simulating an embedded system comprising at least one engine, characterised in that the engine performs the steps of the method. The invention also relates to an embedded system comprising at least one engine, characterised in that the components included in the memories are obtained in accordance with the method.

BRIEF DESCRIPTION OF THE DRAWINGS

The invention will be understood better with the help of the description, given below purely by way of explanation, of an embodiment of the invention, with reference to the accompanying figures.

DETAILED DESCRIPTION

Figure 1:
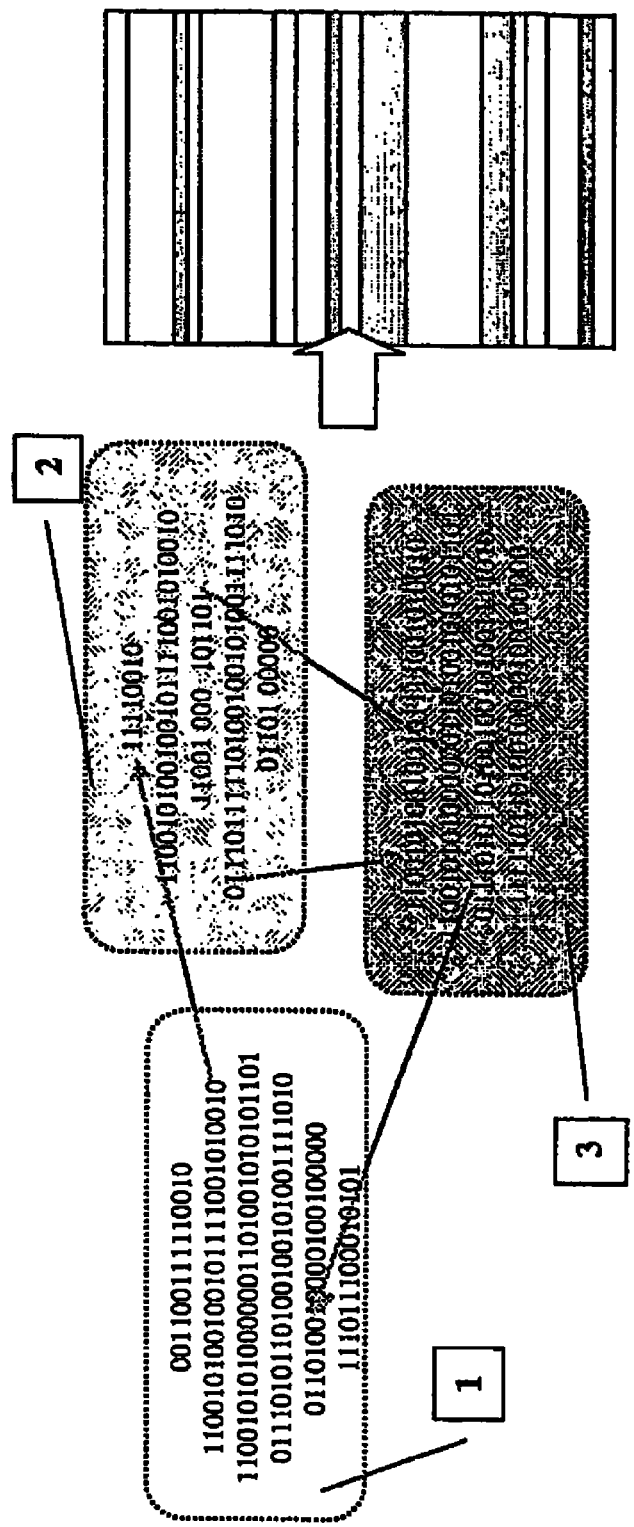
FIG. 1 illustrates a method of managing various codes according to the prior art and a linkage principle.
Figure 2:
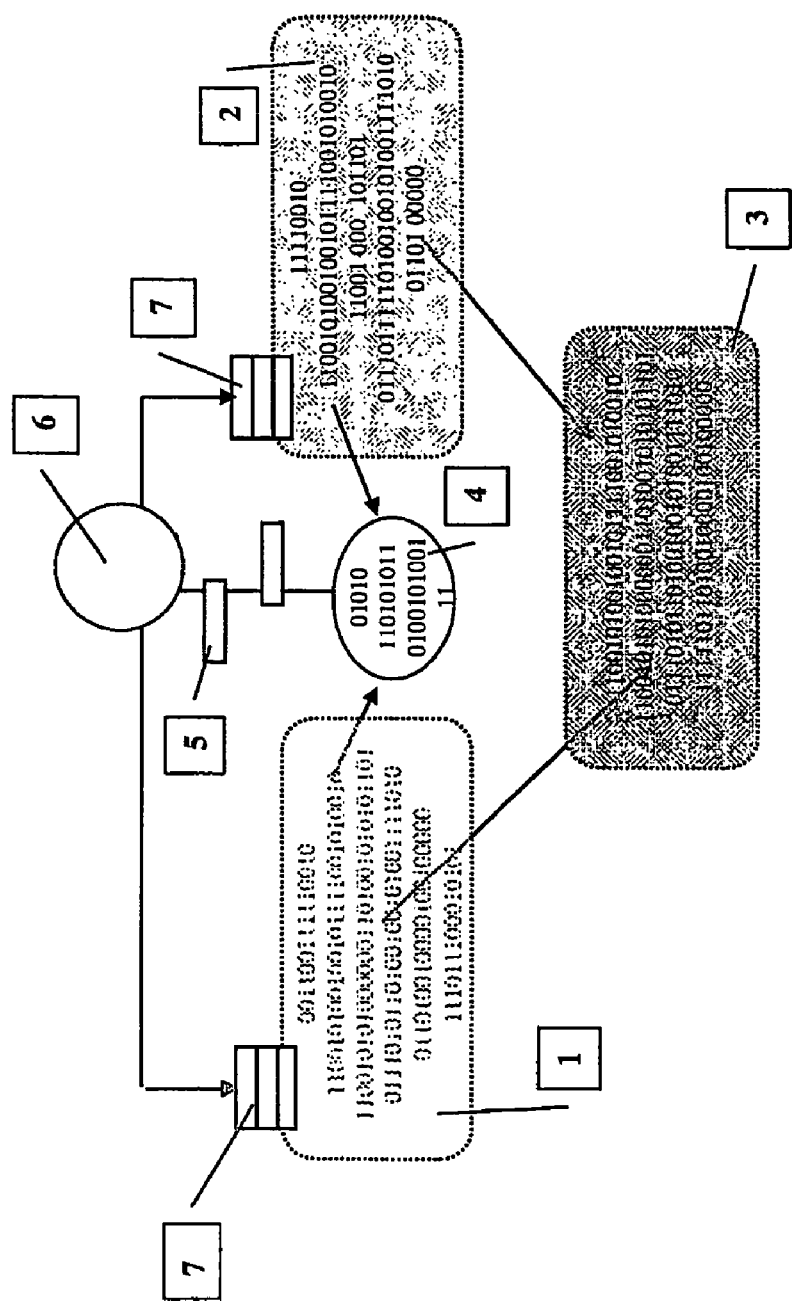
FIG. 2 illustrates a method of managing the various codes according to the prior art and a message system.
Figure 3:
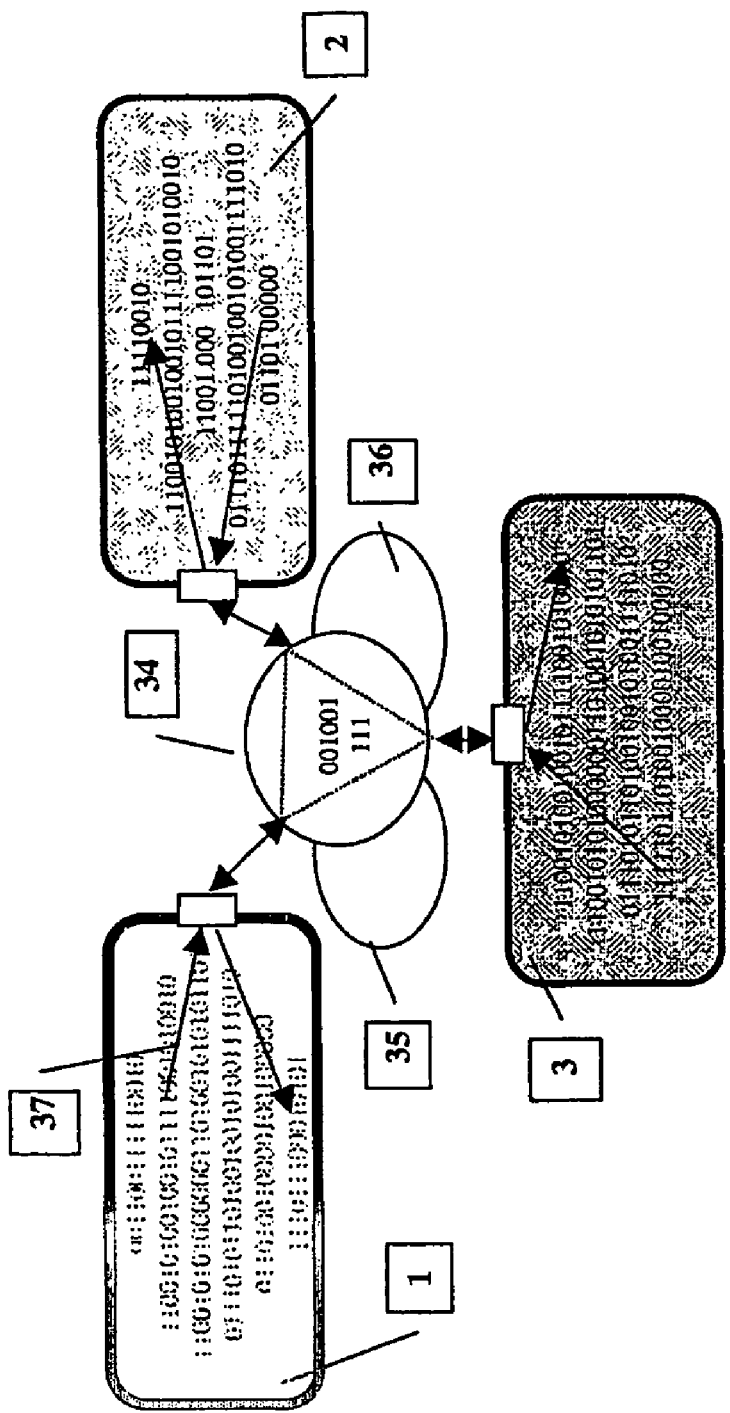
FIG. 3 illustrates the method of managing the components according to the invention.

According to the invention, illustrated in FIG. 3, the three codes 1, 2 and 3 can be managed in an entirely novel fashion, by virtue of the elements referenced in the figure:

34: entity in charge of the switching and control of the various communications (PLUG) between the components 35: database containing the information on the various components 36: manager, in charge of the activation and deactivation of the various components 37: procedural call redirected to the PLUG of the software engine.

With reference to this figure, the basic principle of the invention is as follows:

a standard initial code (compilable in a self-contained fashion) is reworked automatically (pre-processing) so that all the uses of resources external to this initial code are replaced by:

a redirection of the processor to a single entry per component, of a code called either the PROXY or the PLUG. The value of this single entity can be modified subsequently when the component is activated on the embedded system;

the addition of information in the context of the processor before this redirection, information making it possible to know the external resource requested (for example the number of the component requested and the associated service).

The code thus generated can be compiled and linked (editing of link) in a self-contained fashion. To this code, there is added, during this preprocessing phase, certain number of items of supplementary information which will be juxtaposed therewith in order to constitute what is called a component, in particular information on prototyping of the services supplied by the component. Thus a component can communicate with the rest of the system only by means of the PLUG.

An engine is situated on the embedded system and makes it possible to activate the components by keeping information on the services that they implement and especially allows their communication with the PLUG. The PLUG is a software end which, in standard mode, in a few processor instructions, recovers the information of the target function requested by a component and makes the processor "skip" directly to the location of the code where this function (service) is situated. By virtue of this mechanism, the software entities are completely isolated from the rest of the system via the PLUG. The PLUG can, according to the configuration of the system and the associated constraints, add functionalities of communication flow control, redirection (between various processors or between components of different natures or different privileges), replacement of components, translation from one language to another, gateway to another execution entity (other task of the processor, other memory area, other processor, chip card, network, accessories).

This technology thus makes it possible to recover all the advantages related to the use of a component approach (ease of transfer, test, maintenance, stability, security, flexibility of the software configuration, flexibility with regard to the hardware architecture, etc) without any compromise at the performance level or constraint for the developer. Moreover, the software components being generated independently, they can be interchanged, modified, updated or added without any impact on the rest of the system. With this principle, the breakdown into such components can for example be optimised in order to minimise the number of target functions not implemented or according to a correlation between the size of the component and its probability of being modified.

This technology therefore makes it possible for example to replace a component with another one fulfilling the same function or to associate rights over the components directly managed by the PLUG, in order to know which component is authorised to call which other. The PLUG can also be implemented so as to be able to know and possibly register the calls that it processes, with the various associated parameters. This recording system then makes it possible to simulate a component by assimilating it to the function calls made, for example for the purpose of detecting any errors in the embedded code. Once an error is detected, these error detection recordings are then transmitted to another computer resource responsible for analysing the errors. These recordings of the calls can also comprise supplementary information for each of these calls. This information can be information on time, execution content, memory use or any other information necessary for the traceability and management of the components.

Figure 4:
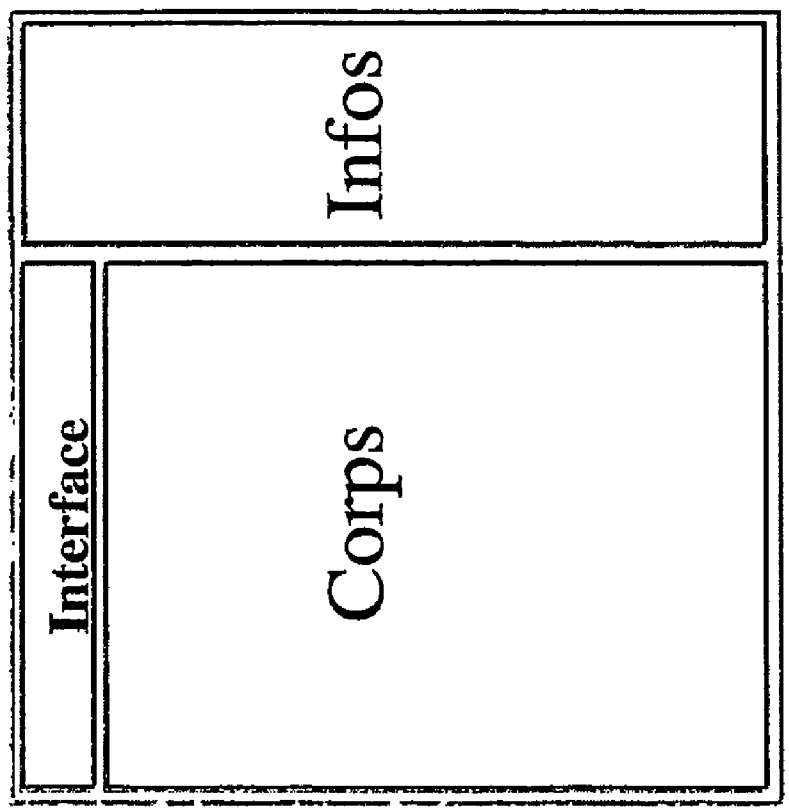
FIG. 4 illustrates a general view of the structure of a component according to the invention.

Illustrated in FIG. 4, a software component according to the invention is a software end, generated so as to be completely isolated, on execution, from the rest of the system apart from via exchanges of requests and service responses vis-à-vis other components. For example, in the case of a component coded in C language (B-Plug component), no exchange, whether it be explicit (via a function call for example) or implicit (via the use of a global variable, etc) is permitted. The component is independent, it is a homogeneous block including data and processing instructions, and this even on execution.

The means of accessing a service of a component is called the interface. The interface can in particular be described via the IDL language, dedicated to this use. According to the type of the various components, this interface is implemented by certain number of functions, methods, etc. For example, the service interface supplied by a B-Plug component is implemented in the form of a C function set, which can be called (via the PLUG) by other components (provided that they have the associated access rights). The implementation of the services, strictly speaking, is situated in the body of the component. The body of the component can be caused to use services of other components. For example: the service "ALARM" generates a specific action at a given moment, preprogrammed. The interface of the Alarm component enables the client to:

define which action to trigger by the alarm,
define the moment when this action must be triggered.

In addition to the interface and the body of the component, a certain number of items of information are added to the component, when it is generated. This information will be used subsequently by the engine, turning on the system. A component can thus for example include the information such as:

the type of component (binary (coded in C), JAVA, etc),
description of the service provided,
list of services and resources necessary for the execution of the component,
privilege, access rights,
way of being accessed (in the context of the caller, in the context of the component, etc).

More particularly, the component includes a certain number of items of information, referred to as service quality information, which will be used by the embedded system to allocate resources to the components before it is executed. This service quality information may be:

the random access memory requirement of the component for its functioning in the form of minimum requirement, average requirement and optimum requirement,
the lists of other components (associated components) that the component needs for its functioning and the version numbers of these associated components. It should be noted that the embedded system will not launch the execution of the component if the associated components do not respond to the version number higher than or equal to that indicated by the component;
the requirement in terms of processing power of the component. It should be noted that the embedded system possibly modifies the frequency of the processor of the embedded system according to the requirements, in particular with regard to power, of the component or associated components. It may also decide to have the component executed on one or other of its computer resources according to the processing availability of the resources. In general terms, the embedded system may decide on execution resources in order to minimise its power consumption.

Figure 5:
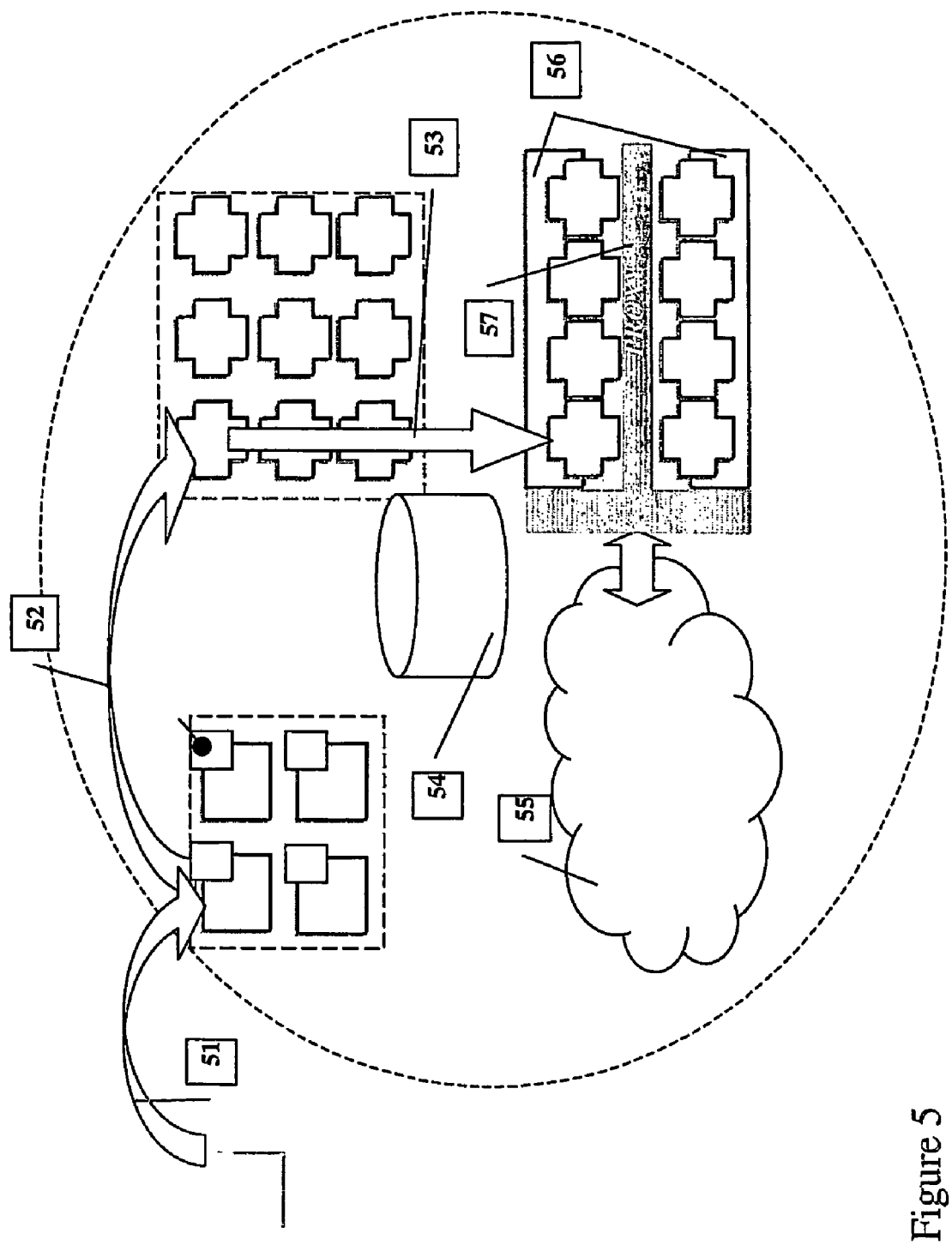
FIG. 5 illustrates the main states of the components according to the invention.

All this service quality information, and the management effected by the embedded system, then enable the latter to refuse the execution of a component if it cannot guarantee the requirements expressed in the service quality information. Moreover, the component includes a certain number of items of information (component information) making it possible to specify the functionalities performed by the component (name of component, version, lists of functions implemented by the component, etc). This component information and the list of components available may be supplied to another computer resource by the embedded system, if a request has been made in advance. The principal states of the components according to the invention are illustrated in FIG. 5. Step 51 is a downloading step where a component can be downloaded in the system.

A label can be generated by the system at this time in order to indicate a certain number of properties (in particular security) related to the component. Any type of downloading can be used during this step. It should be noted that this downloading step is not absolutely necessary since the component may of course already reside on the embedded system.

During step 52, the component is then installed. A certain number of actions are performed in order to enable the component to be activated easily subsequently. Possibly, during this installation of the component, or at the time of its downloading, it may perhaps be in encrypted form for reasons of security. The steps of execution of the component will then in this case comprise, in addition, a decrypting step. More precisely, the installation or execution of the component may depend on prior authorisation. In this case, the authorisation is granted in the case of a match between a key held by the embedded system (system key) and a key held by the component to be executed (component key). The system key may for example be calculated from information specifying the embedded system uniquely.

At the time of execution of the component by the embedded system, a notification is supplied to another computer resource. Following this notification, the resource then transmits an authorisation or refusal to execute the component of the embedded system. The authorisations may for example be in the form of an external key to be combined with the system key and component key. They may be delivered free of charge, or are linked to a financial transaction, before or after the selling of the embedded system.

At step 53, when one of the services provided by a component is requested by a part of the system or when the user wishes to activate a certain service, the associated component is activated. The component is executed in a container, the form of which depends on the type of component. As for the PLUG, this is in charge of the switching of the various exchanges of services between the components. The PLUG can also be connected to the residual code, not compiled in the form of a component according to the invention.

The database 54 records the states of the various components (installable, installed, activated, etc) and a certain number of other items of information (descriptions of services, associated versions, security parameters, location of the service, etc). Once installed, a component is always recorded with the database of its process unit. It should be noted for example that the access rights table can be modified by the final user or remotely, by another computer resource.

During a step 55, a component can also be uninstalled or replaced. The replacement can take place statically (that is to say whilst the component was not active) or dynamically (during activation). Moreover, it should be noted that, when the component is created from the original code, if target functions have as a parameter the address of a function defined in the components itself, this parameter is replaced by the calling of a specific function called a callback function. This function supplies an identifier of the initial function and calls as before the switching function PLUG.

In the same way, on creation of the software component, any information not defined in the original code and which the component needs in order to be able to execute it is identified. This information is then added to the component when it is generated. Once the missing information can be supplied by the system, the code of the component is modified in order to make it executable. Other components can be linked to the software component. In particular:

a container is responsible for the execution of a component, one and the same container being able to be shared by all the components of the same type;

a loader is a specific component making it possible to make a transfer (copy) of a component from one location to another (eg: copying from one memory to another);

a provisioner is responsible for verifying a certain number of parameters of a component in order to be able to download in the system;

a checker checks the integrity of the component, its rights, etc.

Figure 6:
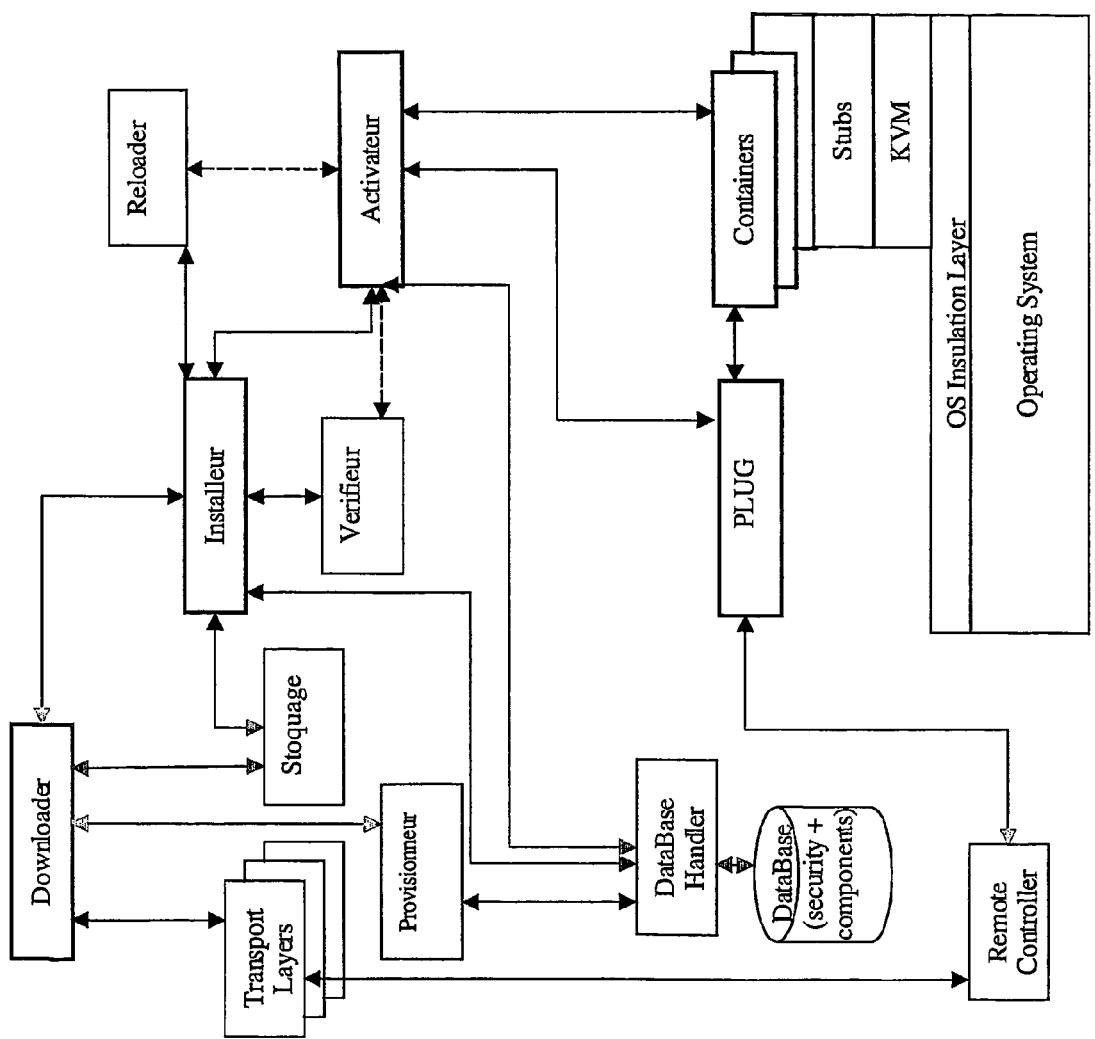
FIG. 6 illustrates the architecture of the engine according to the invention.

Illustrated in FIG. 6, the engine according to the invention is architectured in four distinct parts. The downloader is responsible for the downloading of a software component in the system. It interacts with:

the transport layers of the system, whatever they may be,
the provisioner, which accepts or refuses the downloading,
the storage system or systems available in the system.

The manager includes:
the installer: responsible for the installation and uninstallation of the software components,
the activator: responsible for activating or deactivating the components.

The database is responsible for reassembling the information on the components installed and activated in the system. Finally, the PLUG is responsible for the communication between various components. This implementation is described more widely below.

Figure 7:
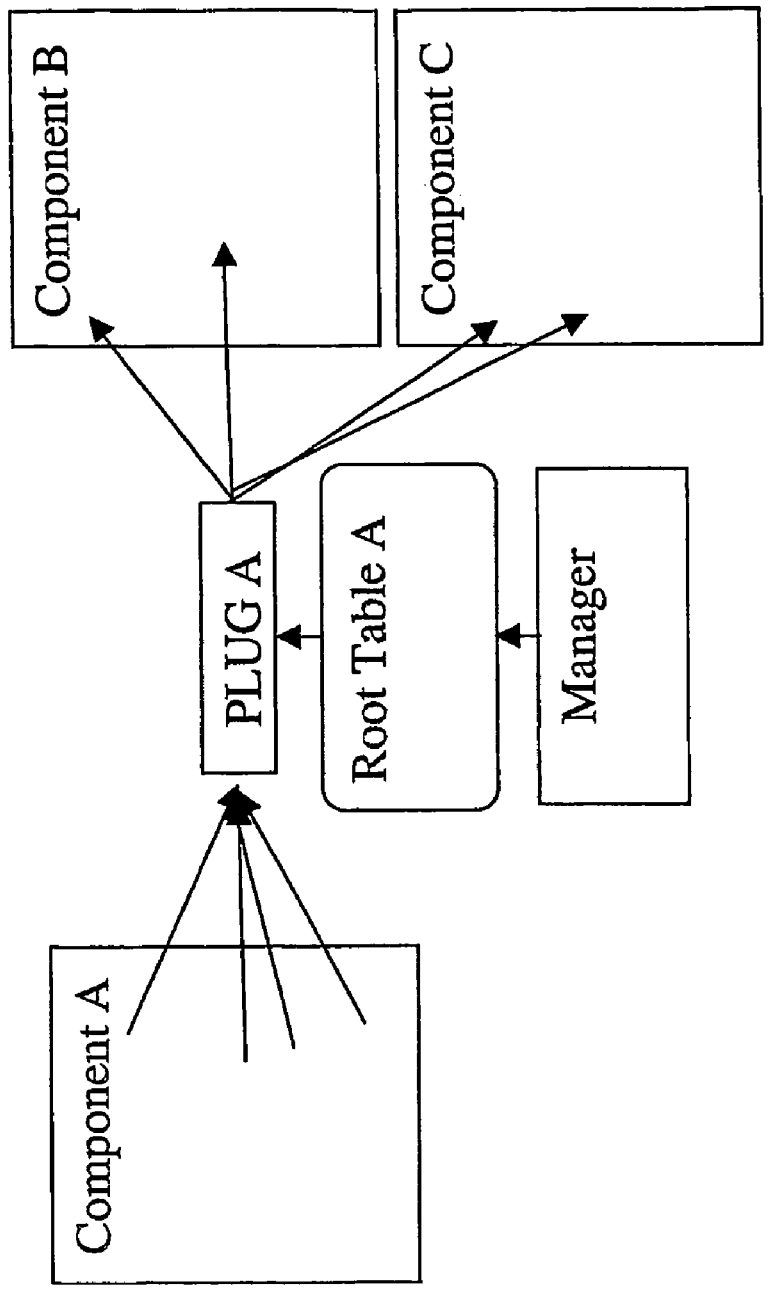
FIG. 7 illustrates the principle of redirection by virtue of the PROXY or PLUG.

The principle of redirection by virtue of the PLUG is illustrated in FIG. 7. First of all, the component is installed in memory. Part of the memory of the system is reserved for the engine. The manager of the engine is responsible for installing the components in this reserved area. The components are stored one after the other.

In addition, when it is executed, the component is placed in a memory area of the embedded system different from the memory area in which it was initially, referred to as the execution memory area. This execution memory area has specific properties in terms of speed of execution, consumption and accessibility particularly suited to the component. The components can also be uninstalled. The manager can thus be caused to carry out operations of defragmentation of the reserve memory area.

The components are then connected to the PLUG. When the component was generated, all the external accesses of this component were redirected to a single meaningless address (for example 0xFFFFFFFF). On installation, the component is allocated an entry address in the PLUG which will be substituted for the meaningless address. Thus any external call of the component is transformed in fact into a call of the entry address to the PLUG dedicated to the component.

On activation, the manager of the engine supplies a switching table to the PLUG indicating where the components are situated and where their information is situated (in particular the various services supplied by each component). When an external service is requested by a component, the processor is thus redirected to the input address of the PLUG linked to the component, whilst two items of information or identifiers have been added, by virtue of the regeneration of the component, according to the invention: the number of the component required and the number of the service desired, or target function. By virtue of these two items of information and the information supplied by the manager, the PLUG will redirect the processor (via an instruction of the JUMP rather than CALL type, that is to say without any new function call nor any copy of information connected to the service requested) to the point where the desired service is situated. The switching function therefore takes as a parameter at least the above two identifiers corresponding to target functions not implemented or to the callback functions in the initial component. These identifiers are stored in the stack or in a register of the processor, used by the PLUG switching function for redirection to the corresponding functions.

This PLUG switching function is performed using a table of correspondence Root Table between the identifiers of the target functions and the address of the target functions. This is produced for example in the form of two sub-tables, a first making the information associated with the software component and the component implementing the target function correspond and a second making the number of the function and its address in the associated component correspond. These subtables are generated when the component is created and are stored in the read-only memory with the code of the component, whilst the principal table Root Table is recorded in random access memory.

Thus assume a component A wishes to call the function DrawLine of a 2D graphical component. When the component is generated, the call of the DrawLine function of the initial code of the component is replaced by the call, with the same parameters as if DrawLine were called, of the PLUG. In addition, the information of the required component (2D graphical component) and the number of the required service (DrawLine service) are added. On execution, the call on the DrawLine function will in fact be replaced by a switching first of all to the PLUG which, by virtue of the number of the component and the service, will be able to redirect the processor to the DrawLine function.

The switching function PLUG also performs a certain number of actions dependent on the target function called. The list of actions per target function is previously defined and stored on the embedded system. The actions can for example be the changing from one context of the processor to another, the installation and execution of another component, the notification of one or more components of the call of the target function, the notification of the user of the embedded system or the notification of another computer resource.

By virtue of the PLUG, and this statically or dynamically, it is thus possible to:

- redirect the communication stream from one component to another,
- replace one component with another (debugged, or updated, or corresponding to another implementation),
- translate the service request from one language to another (in the previous example, the PLUG could translate the request for the DrawLine functionality into another language and send this request, translated, to the appropriate component),
- redirect the request to another processor (for example, the DrawLine function could be implemented on a dedicated graphical processor. At this moment, the PLUG is connected, via any transportation, to another PLUG residing on the graphical processor, and the two PLUGs can pass to each other transparently the requests and service responses), in the embedded system, or outside the embedded system.

Note that in the case of dynamic management, the modifications can for example come from an indication of another computer source or from the user of the embedded system in configuration form. Moreover, if the component called by the PLUG is not available, the latter generates a specific action, determined by the identifier of the unavailable component. These actions can be the creation of an alert message, or the search for a component fulfilling the same function, to the same format or in another format than the one of the initial target function.

It should be noted that the communication between the components can take place on any transport layer. The transport layer can thus be the radio channel in the case of a mobile telephone (at that time, a component can be situated on the network, at the operator level, whilst the other is situated in the mobile telephone) or a link of the Bluetooth or WiFi type making it possible:

- to manage personal area networks (for example, the screen is situated on another apparatus connected to the telephone via a Bluetooth-type radio link),
- to control the access rights between the various components,
- to add visibility by explaining all the communications taking place via the PLUG, for development of systems reasons,
- to redirect some of the communications in order to emulate the associated services on a PC-type emulator,
- or any other application using the fact that the entire communication stream passing between a component and the rest of the system can be manipulated very easily at the PLUG.

Note finally that the breakdown into components of the invention can also be used by a non-embedded system, if this simulates an embedded system.

The invention is described above by way of an example. Naturally a person skilled in the art is in a position to produce different variants of the invention without for all that of departing from the scope of the patent.

The invention claimed is:

1. A method of managing an embedded system including first code associated with an item of computer equipment, second code associated with the embedded system, and a processor associated with the embedded system, the method comprising:

creating a self-contained software component, comprising:
analysing the first code in order to identify target functions that are called by the first code and not implemented in the first code,
determining, for each of the identified target functions, a corresponding function identifier, and
replacing function calls of the identified target functions with a function call of a PLUG switching function implemented by the second code, and
executing the self-contained software component on the processor of the embedded system, the PLUG switching function controlling redirection of the processor to an address of one of the identified target functions, wherein the one of the identified target functions is selected based on a function identifier.

2. The method of claim 1, wherein creating the self-contained software component further comprises:

analysing the first code in order to identify a target function called with a callback parameter, wherein the callback parameter is an address of a first function defined in the self-contained software component, and
replacing the callback parameter with a call of a predetermined function,
automatically generating the predetermined function, the predetermined function including an identifier of the first function and calling the PLUG switching function with the identifier of the first function.

3. The method of claim 1,
wherein creating the self-contained software component further comprises:
analysing the first code in order to identify information not defined in the first code and which the self-contained software component needs in order to be able to be executed, adding a list of the identified information to the self-contained software component, and wherein executing the self-contained software component comprises modifying the self-contained software component once an element of the list of the identified information can be supplied by the embedded system.

4. The method of claim 1, wherein the self-contained software component resides on the embedded system.

5. The method of claim 1, wherein the self-contained software component is downloaded by the second code.

6. The method of claim 1, wherein creating the self-contained software component further comprises encrypting the self-contained software component.

7. The method of claim 6, further comprising decrypting the self-contained software component.

8. The method of claim 1, wherein the self-contained software component is replaced by a second self-contained software component, wherein the self-contained software component and the second self-contained software component implement matching functions.

9. The method of claim 1, wherein executing the self-contained software component further comprises placing the self-contained software component in a first memory area of the embedded system different from a second memory area in which the self-contained software component was initially stored.

10. The method of claim 9, wherein the second memory area is accessible to the processor and possesses predetermined properties in terms of at least one of execution speed, consumption, accessibility, and access rights.

11. The method of claim 1, wherein the PLUG switching function implements a function to display function calls and associated parameters.

12. The method of claim 1, wherein the PLUG switching function implements a function to record function calls and associated parameters.

13. The method of claim 12, wherein the recorded function calls include additional information for each of the recorded function calls.

14. The method of claim 13, wherein the additional information includes time information.

15. The method of claim 13, wherein the additional information includes execution context information.

16. The method of claim 13, wherein the additional information includes memory use information.

17. The method of claim 12, further comprising using the recorded function calls to simulate the self-contained software component in a self-contained fashion.

18. The method of claim 12, further comprising using the recorded function calls for detecting errors in the second code.

19. The method of claim 18, further comprising transmitting the detected errors to a computer resource responsible for analysing the detected errors.

20. The method of claim 1, wherein the function identifiers of the identified target functions include parameters of the PLUG switching function.

21. The method of claim 1, further comprising copying parameters of the identified target functions.

22. The method of claim 1, wherein the function identifier of the one of the identified functions is stored in a stack of the processor before calling the PLUG switching function, the stored function identifier then being used by the PLUG switching function in order to control redirection to the one of the identified functions corresponding to the stored function identifier.

23. The method of claim 1, wherein the function identifier of the one of the identified functions is stored in a register of the processor before calling the PLUG switching function, the stored function identifier then being used by the PLUG switching function in order to control redirection to the one of the identified functions corresponding to the stored function identifier.

24. The method of claim 1, wherein the identified target functions are implemented on a second processor of the embedded system.

25. The method of claim 1, wherein the identified target functions are implemented on a computer resource other than the embedded system.

26. The method of claim 1, wherein the PLUG switching function performs a set of predetermined actions associated with a call of a selected target function, the set of predetermined actions having previously been defined and stored on the embedded system.

27. The method of claim 26, wherein the set of predetermined actions comprises switching from a first context of the processor to a second context of the processor.

28. The method of claim 26, wherein the set of predetermined actions comprises installing and execution of a second self-contained software component.

29. The method of claim 26, wherein the set of predetermined actions comprises notifying a second self-contained software component of the call of the selected target function.

30. The method of claim 26, wherein the set of predetermined actions comprises notifying a user of the embedded system.

31. The method of claim 26, wherein the set of predetermined actions comprises notifying a computer resource other than the embedded system.

32. The method of claim 26, further comprising dynamically modifying the set of predetermined actions.

33. The method of claim 1, wherein the PLUG switching function generates a predetermined action when the one of the identified target functions corresponds to an unavailable function identifier.

34. The method of claim 33, wherein the predetermined action is determined by an attribute of the unavailable function identifier.

35. The method of claim 1, wherein the PLUG switching function verifies rights of the self-contained software component to call the one of the identified target functions.

36. The method of claim 35, wherein the verification is performed from an access rights table indicating which component can call which function.

37. The method of claim 36, wherein the access rights table can be modified by a user.

38. The method of claim 36, wherein the access rights table can be modified remotely by a computer resource other than the embedded system.

39. The method of claim 1, wherein the PLUG switching function, when the one of the identified target functions is not available, searches for an equivalent function and executes the equivalent function.

40. The method of claim 1, wherein the PLUG switching function, when the one of the identified target functions is not available, searches for a computer resource other than the embedded system corresponding to the one of the identified target functions, and executes the one of the identified target functions from the computer resource resulting from the search.

41. The method of claim 1, wherein each of the function identifiers include a first item of information identifying a software component implementing the target function corresponding to the function identifier and a second item of information corresponding to a number of the target function corresponding to the function identifier in the software component identified by the first item of information.

42. The method of claim 1, wherein the PLUG switching function is performed using a table of correspondence between target function identifiers and addresses of target functions.

43. The method of claim 41, wherein the table of correspondence is subdivided into:
a first table of correspondence between information corresponding to software components and components implementing target functions, and
for each of the software components, a second table of correspondence between numbers of target functions and addresses of the target functions.

44. The method of claim 43, further comprising generating the second tables when the self-contained software component is created.

45. The method of claim 43, wherein the second tables are recorded in read-only memory.

46. The method of claim 43, wherein the first table is recorded in random access memory.

47. The method of claim 1, further comprising installing the self-contained software component, wherein the installing is dependent on a prior authorisation.

48. The method of claim 1, wherein the executing the self-contained software component is dependent on a prior authorisation.

49. The method of claim 48, wherein the prior authorisation is dependent on a match between a system key held by the embedded system and a component key held by the self-contained software component, the system key being able to be calculated from information specifying the embedded system uniquely.

50. The method of claim 48, further comprising:
when the self-contained software component is to be executed by the embedded system, supplying a notification a computer resource other than the embedded system; and
following the notification, transmitting by the computer resource one of an authorisation and a refusal to execute the self-contained software component to the embedded system.

51. The method of claim 50, wherein the authorisation transmitted by the computer resource includes an external key that is combined with the component key and the system key in order to authorise executing the self-contained software component on the embedded system.

52. The method of claim 50, wherein the authorisation is transmitted by the computer resource based on correct performance of a financial transaction by the computer resource.

53. The method of claim 51, wherein the external key is saved in the embedded system before its-commercial deployment of the embedded system.

54. The method of claim 51, wherein the external key is saved in the embedded system following a financial transaction.

55. The method of claim 1, wherein the self-contained software component includes service quality information.

56. The method of claim 55, further comprising using the service quality information by the embedded system to allocate resources before executing the self-contained software component.

57. The method of claim 55, wherein the service quality information includes a random access memory requirement of the self-contained software component.

58. The method of claim 57, wherein the random access memory requirement includes at least one of minimum requirement information, average requirement information, and optimum requirement information.

59. The method of claim 55, wherein the service quality information includes a list of associated components that the self-contained software component needs for its functioning.

60. The method of claim 59, wherein the list of associated components includes version number information of each member of the list of associated components.

61. The method of claim 60, wherein the embedded system prevents executing the self-contained software component when available components do not match the version number information.

62. The method of claim 60, wherein the embedded system prevents executing the self-contained software component when available components do not have equal or higher version numbers than specified by the version number information.

63. The method of claim 55, wherein the service quality information includes a processing power requirement of the self-contained software component.

64. The method of claim 63, wherein the embedded system modifies a frequency of the processor based on the processing power requirement.

65. The method of claim 63, wherein the embedded system selects one of a plurality of computer resources of the embedded system to execute the self-contained software component based on availability and processing power of the plurality of computer resources, wherein the plurality of computer resources includes the processor.

66. The method of claim 1, wherein the embedded system selects one of a plurality of computer resources to execute the self-contained software component based on minimizing power consumption, wherein the plurality of computer resources includes the processor.

67. The method of claim 55, further comprising preventing executing the self-contained software component when the embedded system cannot guarantee the service quality information.

68. The method of claim 1, wherein the self-contained software component includes information specifying functions performed by the self-contained software component.

69. The method of claim 68, wherein the information includes a name of the self-contained software component.

70. The method of claim 68, wherein the information includes a version number of the self-contained software component.

71. The method of claim 68, wherein the information includes a list of functions implemented by the self-contained software component.

72. The method of claim 68, further comprising supplying a list of components available on the embedded system including the self-contained software component, and the information corresponding to each of the list of components, to a computer resource other than the embedded system, the computer resource previously having made a request for the list.

73. A method of managing an embedded system, wherein code that is to be executed by the embedded system comprises a plurality of self-contained software components obtained according to the method of claim 1, wherein the plurality of self-contained software components includes the self-contained software component.

74. The method of claim 73, wherein the plurality of self-contained software components of the initial system are organized based on size of the plurality of self-contained software components and probabilities of the plurality of self-contained software components being modified subsequently.

75. An embedded system comprising an engine, wherein the engine performs the steps of the method of claim 1.

76. A system simulating an embedded system comprising an engine, wherein the engine performs the method of claim 1.

77. An embedded engine that performs the method of claim 1.

78. A method of creating and executing a self-contained software component using a processor, the method comprising:
- identifying function calls in embedded software code;
- determining selected ones of the function calls that are not implemented in the embedded software code;
- for each call of the selected ones of the function calls, determining a corresponding function identifier based on a target of the call;
- replacing each call of the selected ones of the function calls with a replacement call to a PLUG switching function,
- wherein the replacement call to the PLUG switching function includes an address of the PLUG switching function and function information based on the function identifier corresponding to the call, and
- wherein the function information includes a software component identifier uniquely identifying a software component and a software subcomponent identifier uniquely identifying a software subcomponent of the software component, wherein the software subcomponent provides functionality requested by the call;
- creating executable code based on the embedded software code;
- associating service information with the executable code, wherein the service information specifies software components corresponding to the selected ones of the function calls; and
- using the processor, selectively executing the executable code when software components matching the service information are available,
- wherein the executing comprises:
  - transferring control to the PLUG switching function when one of the replacement calls is encountered;
  - prior to transferring control, storing in temporary memory the function information corresponding to the one of the replacement calls;
  - in the PLUG switching function, identifying a software component based on the software component identifier of the function information;
  - in the PLUG switching function, identifying a software subcomponent of the identified software component based on the software subcomponent identifier of the function information; and
  - in the PLUG switching function, transferring control to the identified software subcomponent.

79. An embedded system for creating and executing a self-contained software component, comprising:
- a PLUG switching engine;
- a creation engine that:
  - identifies function calls in embedded software code;
  - determines selected ones of the function calls that are not implemented in the embedded software code;
  - for each call of the selected ones of the function calls, determines a corresponding function identifier based on a target of the call;
  - replaces each call of the selected ones of the function calls with a replacement call to a PLUG switching engine,
  - wherein the replacement call to the PLUG switching engine includes an address of the PLUG switching engine and function information based on the function identifier corresponding to the call, and
  - wherein the function information includes a software component identifier uniquely identifying a software component and a software subcomponent identifier uniquely identifying a software subcomponent of the software component, wherein the software subcomponent provides functionality requested by the call;
  - creates executable code based on the embedded software code; and
  - associates service information with the executable code, wherein the service information specifies software components corresponding to the selected ones of the function calls; and
- an execution engine that:
  - selectively executes the executable code when software components matching the service information are available;
  - transfers control to the PLUG switching engine when one of the replacement calls is encountered; and
  - stores the function information corresponding to the one of the replacement calls in temporary memory prior to transferring control;
- wherein the PLUG switching engine:
  - identifies a software component based on the software component identifier of the function information;
  - identifies a software subcomponent of the identified software component based on the software subcomponent identifier of the function information; and
  - transfers control to the identified software subcomponent.

* * * * *